United States Patent
Liu et al.

(10) Patent No.: US 7,843,783 B2
(45) Date of Patent: Nov. 30, 2010

(54) METHOD FOR AUTOMATICALLY CALIBRATING OUTPUT POWER OF OPTICAL PICK-UP HEAD AND OPTICAL DISC DRIVER USING THE METHOD

(75) Inventors: Yao-Wen Liu, Hsinchu (TW); Wen-Chun Feng, Taipei (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 322 days.

(21) Appl. No.: 12/136,781

(22) Filed: Jun. 11, 2008

(65) Prior Publication Data

US 2008/0310262 A1 Dec. 18, 2008

(30) Foreign Application Priority Data

Jun. 12, 2007 (TW) ............................... 96121161 A

(51) Int. Cl.
*G11B 7/00* (2006.01)

(52) U.S. Cl. .................................. 369/47.51; 369/53.34

(58) Field of Classification Search ....................... None
See application file for complete search history.

(56) References Cited

U.S. PATENT DOCUMENTS

| | | | |
|---|---|---|---|
| 6,621,778 B1 | 9/2003 | Lu et al. | |
| 6,944,109 B2 | 9/2005 | Wang et al. | |
| 7,406,015 B2 * | 7/2008 | Ogawa | 369/53.27 |
| 7,746,741 B2 * | 6/2010 | Yanagawa et al. | 369/47.53 |
| 2005/0286390 A1 * | 12/2005 | Minemura et al. | 369/116 |
| 2006/0083135 A1 * | 4/2006 | Minemura | 369/47.51 |
| 2008/0037392 A1 * | 2/2008 | Uchino et al. | 369/47.5 |

* cited by examiner

*Primary Examiner*—Peter Vincent Agustin
(74) *Attorney, Agent, or Firm*—Jianq Chyun IP Office

(57) ABSTRACT

A method for automatically calibrating an output power of an optical pick-up head is provided. First, an optical disc is provided, wherein a relationship between the output power for writing the optical disc and a specific parameter corresponding thereto is defined as a first function. Next, the optical pick-up head is controlled to perform a writing operation on the optical disc according to an instruction value, and obtain the specific parameter corresponding to the instruction value. Next, the output power corresponding to the instruction value is obtained according to the first function and the specific parameter. Next, the instruction value is adjusted according to the instruction value and the output power, and the output power of the optical pick-up head is calibrated according to the adjusted instruction value.

13 Claims, 7 Drawing Sheets

METHOD FOR AUTOMATICALLY CALIBRATING OUTPUT POWER OF OPTICAL PICK-UP HEAD AND OPTICAL DISC DRIVER USING THE METHOD

CROSS-REFERENCE TO RELATED APPLICATION

This application claims the priority benefit of Taiwan application serial no. 96121161, filed on Jun. 12, 2007. The entirety of the above-mentioned patent application is hereby incorporated by reference herein and made a part of this specification.

BACKGROUND OF THE INVENTION

1. Field of the Invention

The present invention generally relates to a method for automatically calibrating an output power of an optical pick-up head, and more particularly, to a method for automatically calibrating an output power of optical pick-up head according to a relationship between the output power for writing an optical disc and a specific parameter.

2. Description of Related Art

Multi-pulse or multi-level write strategies are currently used for optical disc drivers to perform writing operations on optical discs. These two write strategies are featured by controlling analog channels of a laser diode driver from the optical pick-up head, so that the optical pick-up head emits an output power of multi-pulse or multi-level for writing the optical discs.

FIG. 1 is a schematic diagram illustrating a conventional optical pick-up head. Referring to FIG. 1, the optical pick-up head includes digital-to-analog converters 101a, 101b, 101n, a laser diode driver 102, a laser diode 103, a beam splitter 104, a concentrating lens 105, a pre-diode 106, and a one-eighth diode 108. The laser diode driver 102, has a plurality of analog input channels, each of which correspond to an input value, e.g., X1, and an enabling signal, e.g., EN1, of a digital-to-analog converter, e.g., 101a, for controlling a value and time of the output power of the laser diode 103 respectively.

There are different mapping relationships of the input values of the digital-to-analog converters in correspondence with the output power of the laser diode 103. The laser diode driver 102 is adapted to sum up the enabled analog input channels, so as to drive the laser diode 103 to emit laser. The laser is split by the beam splitter 104 into two parts. A first part illuminates on the pre-diode 106, e.g., a photo sensor, a second part passes through the concentrating lens 105 and incidents on the optical disc 107. The second part is then reflected by the optical disc 107 back to the one-eighth diode 108 for further signal processing by the optical disc driver.

However, in production of optical pick-up heads, errors of the optical elements used thereby and tolerances in assembling unavoidably cause deviations between the input values of the digital-to-analog converters and the actual output powers of the laser diode. A typical solution addressing to this issue is to employ an auto power control loop for feeding back an output parameter detected by the pre-diode 106, to compensate the deviation.

FIG. 2 is a schematic structural diagram of auto power control loop. Referring to FIG. 2, the auto power control loop 200 includes a comparator 204, an integrator 205, a sampling maintenance circuit 207, and an amplifier 208. As discussed above, when the laser diode driver 202 drives the laser diode to emit laser, the pre-diode 206 receives a part of the laser emitted from the laser diode.

An operation of the auto power control loop 200 includes the following process steps. First, the pre-diode 206 detects an output parameter FPDO. Next, the output parameters FPDO are sampled by the sampling maintenance circuit 207 and amplified by the amplifier 208 in sequence, so as to obtain an output signal FPDO'. Next, the comparator 204 compares the output signal FPDO' with an input value X that has been converted by the ADC 201, and then the integrator 205 provides the adjusted input value to the analog input channel of the laser diode driver 202 for automatically calibrating the output power of the optical pick-up head.

Unfortunately, different optical disc drivers are often distinct as having differences in resistance of PCB, ambient noise, and laser diode driving chips. Therefore, even when identical input values of a digital-to-analog converter are provided for controlling the writing of optical pick-up head, the input values often deviate from the expectation when arriving at the digital-to-analog converter, which causes differences between output powers of the laser diode 103. The foregoing auto power control loop is incapable of compensating these differences. Therefore, it is a concern for advancement to study the conversion characteristics of different analog input channels of the optical pick-up head relating to different optical disc drivers, and adaptively adjust the output power of the optical pick-up head, so as to optimize the writing performance of the optical disc driver.

FIG. 3 is a schematic diagram illustrating measuring characteristics of the optical pick-up head using a power meter. Referring to FIG. 3, the optical pick-up head of the optical disc driver 303 includes a pre-diode, for automatically calibrating a magnitude of the laser emitted by the optical pick-up head. A computer 302 provides an input value of a digital-to-analog converter (hereinafter power instruction value) to the optical disc driver 303 via an integrated drive electronics (IDE). Next, a power meter 304 is employed as measuring a power of the laser emitted from the optical pick-up head. An output signal S outputted from the power meter is an analog signal. The output signal S is then converted by a digital-to-analog converter 301 into a digital signal. The digital signal is then transmitted to the computer 302. A relationship between the power instruction values and the output power of the optical pick-up head can be obtained by repeating the foregoing process. The relationship is also known as conversion characteristics. However, the power meter 304 is an excessive device to the optical disc driver. Therefore it is inconvenient for the manufacturers to sequentially test the conversion characteristics with such a power meter.

FIG. 4 is a schematic diagram illustrating measuring characteristics of the optical pick-up head using a bar code. Referring to FIG. 4, a bar code is stuck to an optical pick-up head of the optical disc driver 403 by the manufacturer of the optical disc driver 403. The bar code contains information about a relationship between an output current of the pre-diode and the output power of the optical pick-up head, which is also named as sensitivity thereof. For example, the information contained in the bar code is a ratio between the output current of the pre-diode and the output power of the optical pick-up head. In such a way, a bar code reader can be used for retrieving the information from the bar code and thus obtaining the sensitivity related information and transfer the same to the computer 402. When the computer 402 provides a power instruction value to the optical disc driver 403 for writing, the relationship between the power instruction value and the output power of the optical pick-up head can be obtained referring to the sensitivity and the output current of the pre-diode.

However, the bar code reader is also an excessive device. In related art, U.S. Pat. No. 6,621,778 proposes an automatic calibration of the output power of a pickup head for an optical information recording apparatus. It assumes that characteristics of pre-diodes are similar, and according to which the method selects a plurality of pre-diodes and measures relationships between output currents of the pre-diodes and the output power of the optical pick-up head, and then calculate an average thereof. Each optical disc driver obtains the relationship between the power instruction value and output power of the optical pick-up head, according to the average and the output current of the pre-diode, when receiving power instruction value for writing. However, such a method relying on the average for calibrating output power of the optical pick-up head is less precise.

Further, U.S. Pat. No. 6,944,109 proposes an automatic control method for generating stable laser power of an optical disc driver, in which a plurality of optical disc drivers are tested as samples for reference. Relationships between output parameters of the pre-diodes and the power instruction values are obtained and averaged, so as to obtain a standardized curve. When the optical disc driver receives an power instruction value for writing operation, the relationship between the output parameter of the pre-diode and the power instruction value is measured and compared with the standardized curve, and thus obtaining a deviation function thereby. The deviation function is adapted for compensating the power instruction value so as to control or calibrate the output power of the optical pick-up head.

SUMMARY OF THE INVENTION

Accordingly, the present invention is directed to a method for automatically calibrating an output power of an optical pick-up head. According to an embodiment of the present invention, when an optical pick-up head receives an instruction value for performing a writing operation, the output power corresponding to the instruction value is obtained according to a fed back specific parameter and a known relationship between the output power for writing the optic disc and the specific parameter; and thereby the instruction value is adjusted for controlling the output power of the optical pick-up head for writing. As such, the method according to the present invention is not only adapted for rapidly and precisely calibrating the output power of the optical pick-up head in accordance with the relationship between the instruction value and the output power, but also avoids employing excessive devices which is likely to cause difficulty to mass production.

The present invention further provides a method for automatically calibrating an output power of an optical pick-up head. According to an embodiment of the present invention, when an optical pick-up head receives an instruction value for performing a writing operation, a relationship between an output parameter of a pre-diode and the output power is obtained according to a fed back specific parameter, the output parameter of the pre-diode, and a known relationship between the output power for writing the optical disc and the specific parameter; and thereby a relationship between the instruction value and the output power is obtained according to the relationship between the output parameter of the pre-diode and the output power. Thus, the instruction value is adjusted for controlling the output power of the optical pick-up head for writing. The current method has advantages similar to the previous embodiment.

The present invention is also directed to an optical disc driver adapted for automatically calibrating output powers of an optical pick-up head. The optical disc driver is adapted for the foregoing method and also has the foregoing advantages.

The present invention further provides a method for automatically calibrating an output power of an optical pick-up head. First, an optical disc is provided, there being a first function which is a relationship between the output power for writing the optical disc and a specific parameter. Next, a writing operation is performed by controlling the optical pick-up head to write the optic disc according to an instruction value, and the specific parameter corresponding to the instruction value is obtained. Next, the output power corresponding to the instruction value is obtained according to the first function and the specific parameter, and the instruction value is adjusted according to the instruction value and the output power for calibrating the output power of the optical pick-up head.

The present invention further provides a method for automatically calibrating an output power of an optical pick-up head having a pre-diode sensor. First, an optical disc is provided, there being a first function which is a relationship between the output power for writing the optical disc and a specific parameter. Next, a writing operation is performed by controlling the optical pick-up head to write the optic disc according to an instruction value, and the specific parameter corresponding to the instruction value and an output parameter of the pre-diode sensor are obtained. Next, the output power corresponding to the output parameter is obtained according to the first function and the specific parameter, and thereby the sensitivity is calculated. A relationship between the instruction value and the output power is obtained according to the sensitivity and the output parameter. The instruction value is then adjusted according to the instruction value and the output power for calibrating the output power of the optical pick-up head.

According to an embodiment of the foregoing method for automatically calibrating an output power of an optical pick-up head, an optimal output power for the optical disc is read. Next, the optical pick-up head within a certain power range is controlled for writing the optical disc with the output power, according to the optimal output power, and an alternating current coupling high frequency signal is retrieved, so as the specific parameter corresponding to the output power can be obtained according to the alternating current coupling high frequency signal.

According to an embodiment of the foregoing method for automatically calibrating an output power of an optical pick-up head, the step of controlling the optical pick-up head to write the optical disc according to the instruction value, and obtaining the specific parameter corresponding to the instruction value further comprises retrieving an alternating current coupling high frequency signal after writing the optical disc, and thus obtaining the specific parameter corresponding to the output power.

The present invention further provides an optical disc driver adapted for automatically calibrating an output power of an optical pick-up head. The optical disc driver comprises an optical pick-up head, an automatic power control module, and a detect module. The automatic power control module is coupled to the optical pick-up head, for performing a writing operation on an optical disc according to an instruction value. A relationship between the output power for writing the optical disc and a specific parameter is defined as a first function. The detect module is coupled to the automatic power control module, for detecting the specific parameter corresponding to the instruction value of the optical disc and transmitting the specific parameter to the automatic power control module. The automatic power control module is adapted to calculate the output power corresponding to the instruction value according to the first function and the specific parameter, and adjusting the instruction value according to the instruction value and the output power for calibrating the output power of the optical pick-up head.

The present invention relies on a known relationship between an output power for writing optical discs and a specific parameter for rapidly obtaining relationship between an instruction value and the output power when the optical pick-up head receives the instruction value for writing, so as to control the output power of the optical pick-up head.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
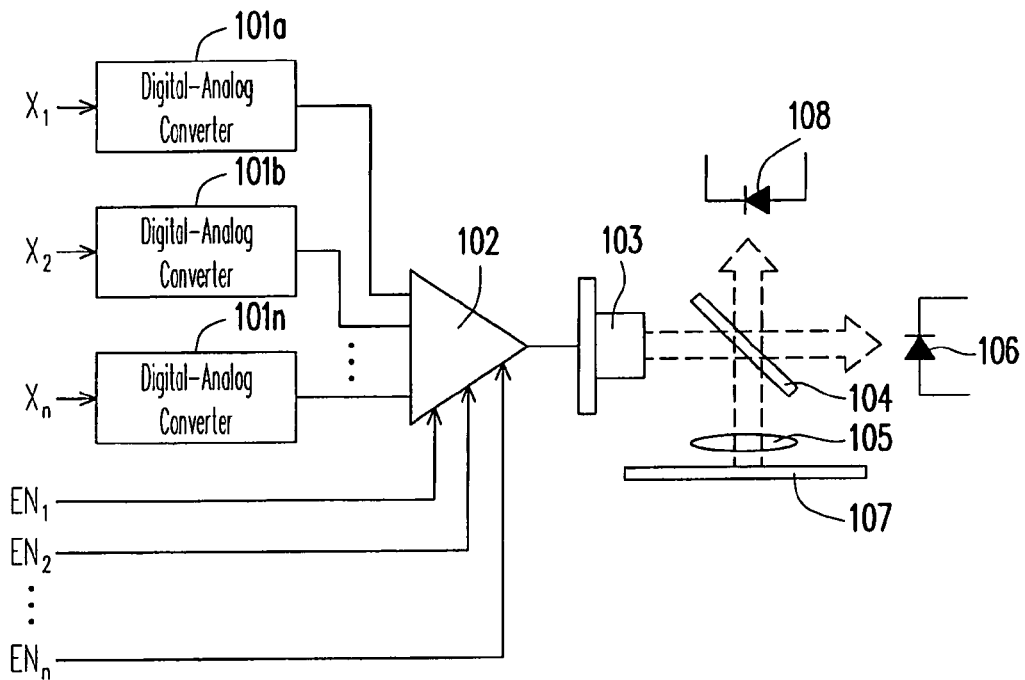
FIG. 1 is a schematic diagram of a structure of an optical pick-up head.
Figure 2:
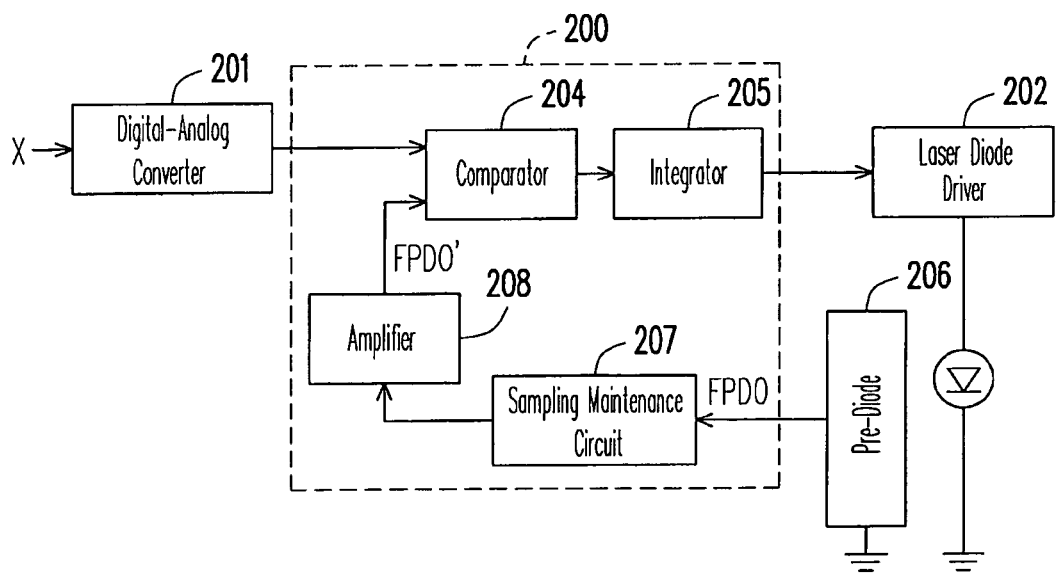
FIG. 2 is a block diagram illustrating an automatic power control loop for controlling an output power of an optical pick-up head.
Figure 3:
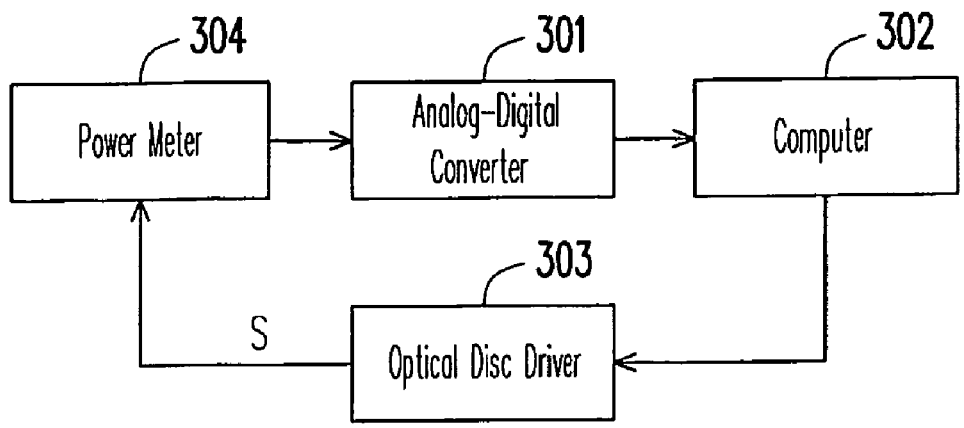
FIG. 3 is a schematic diagram illustrating a power meter used for measuring a characteristic of an optical pick-up head.
Figure 4:
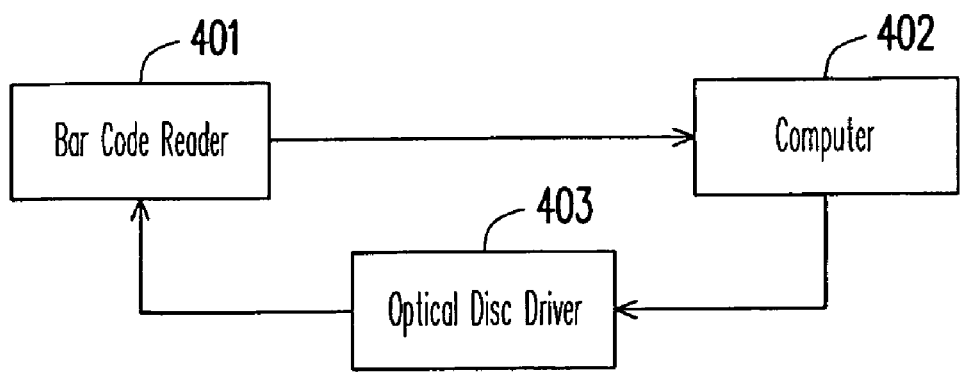
FIG. 4 is a schematic diagram illustrating a bar code reader used for measuring a characteristic of an optical pick-up head.

Reference will now be made in detail to the present preferred embodiments of the invention, examples of which are illustrated in the accompanying drawings. Wherever possible, the same reference numbers are used in the drawings and the description to refer to the same or like parts.

Because of unavoidable distinction of optical features of optical elements in different optical pick-up heads, and errors when assembling the optical elements, the conversion from instruction value received by the optical pick-up head, e.g., input voltages, to real output power writing to an optical disc causes inaccuracy on controlling. Further, resistances, noise interferences characteristics of different printed circuit boards used thereby are also different, which also causes the instruction value practically transmitted to the optical pick-up head deviated from the expected instruction value. Accordingly, the instruction value must be adjusted for calibrating the output power of the optical pick-up head, so as to avoid poor performance of the output power of the optical disc driver.

Figure 5:
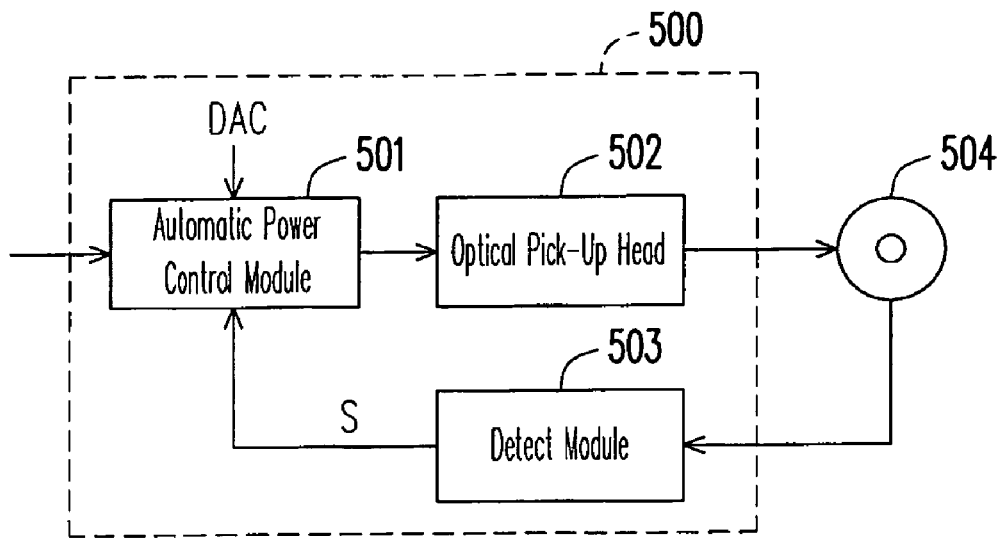
FIG. 5 is an optical disc driver adapted for automatically calibrating an output power of an optical pick-up head thereof according to an embodiment of the present invention.

FIG. 5 is an optical disc driver adapted for automatically calibrating an output power of an optical pick-up head thereof according to an embodiment of the present invention. Referring to FIG. 5, the optical disc driver 500 comprises an automatic power control module 501, an optical pick-up head 502, and a detect module 503. The automatic power control module 501 is coupled to the optical pick-up head 502, for controlling the optical pick-up to perform a writing operation on an optical disc 504 according to an instruction value DAC. The detect module 503 is coupled to the automatic power control module 501, for detecting a specific parameter corresponding to the instruction value DAC in the optical disc 504 after the writing operation, and transmitting the specific parameter to the automatic power control module 501 thereafter.

Figure 6:
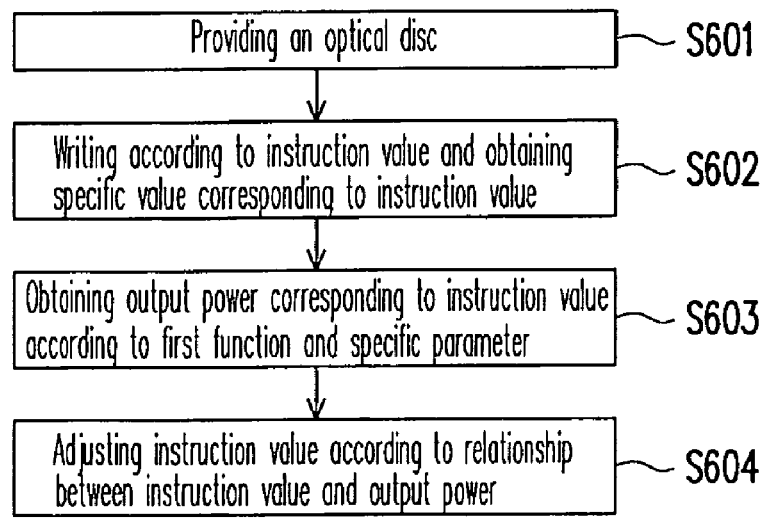
FIG. 6 is a flow chart illustrating a method for automatically calibrating an output power of an optical pick-up head thereof according to an embodiment of the present invention.

FIG. 6 is a flow chart illustrating a method for automatically calibrating an output power of an optical pick-up head thereof according to an embodiment of the present invention. At step S601, a test optical disc is provided, from which a corresponding relationship between the output power for writing the optical disc 504 and the specific parameter can be obtained, that is designated as a first function. Next, at step S602, the automatic power control module 501 performs a writing operation on the optical disc 504 according to the instruction value DAC, and the detect module 503 detects the specific parameter corresponding to the instruction value DAC.

At step S603, the automatic power control module 501 obtains the output power corresponding to the instruction value DAC according to the known first function and the obtained specific parameter. It can be learnt from steps S602 and S603 that if different instruction values are set for performing writing operation, the relationship between the instruction value and the output power can be obtained according to the first function. As such, the automatic power control module 501 can adaptively adjust the instruction value DAC according to the relationship between the instruction value and the output power so as to control the output power of the optical pick-up head 502 at step S604.

Hereinafter, an embodiment of obtaining the corresponding relationship between the output power for writing the optical disc 504 and the specific parameter, i.e., step S601 by employing the test optical disc may be illustrated in detail. It is typical in the art that the optical disc manufacturer provides information of optimal output power P for writing the certain optical disc on the optical disc. In the embodiment, a plurality of test powers $P_1, P_2, \ldots, P_n$ within a test power range which is determined in accordance with the optimal output power (or a preset optimal output power) P are used respectively by the optical pick-up head 502 to perform test writing operations on the optical disc 504.

After writing the optical disc 504, the detect module 503 retrieves an alternating current coupling high frequency signal from the optical disc 504, from which specific parameters corresponding to the output powers are obtained. According to an aspect of the embodiment, in order to more precisely obtain the relationship between the output power for writing the optical disc 504 and the specific parameter, a plurality of optical discs 504 can be used for the above test writing.

Figure 7:
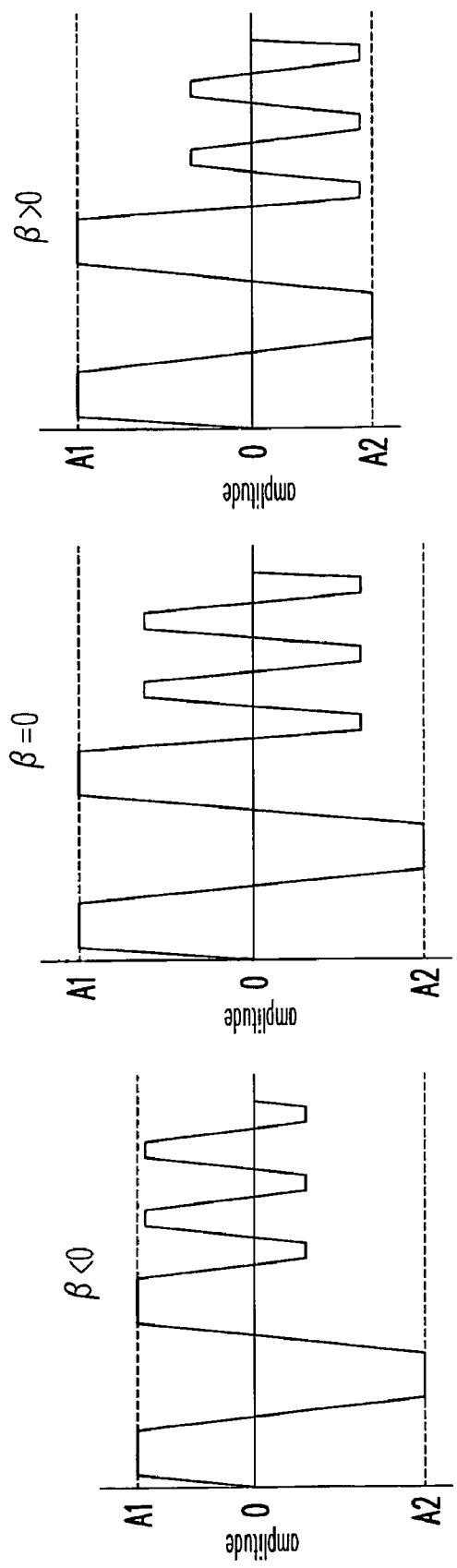
FIGS. 7A through 7C are schematic diagrams illustrating alternating current coupling high frequency signals affected by the output power.

Further, according to an aspect of the embodiment, the specific parameter of the alternating current coupling high frequency signal is a symmetrical parameter $\beta$. FIGS. 7A through 7C are schematic diagrams illustrating alternating current coupling high frequency signals affected by the output power, in which alternating current coupling high frequency signals in three different situations, i.e., too small, optimal, and too high output powers being applied respectively for writing the optical disc 504 are exemplified. The symmetrical parameter β of the alternating current coupling high frequency signals are defined as $β=(A_1+A_2)/(A_1-A_2)$, in which $A_1$ and $A_2$ are the amplitudes of the alternating current coupling high frequency signal, and the symmetrical parameters β of FIGS. 7A, 7B, and 7C are smaller than 0, equal to 0, and greater than 0, respectively. Therefore, as shown in FIG. 7B, the alternating current coupling high frequency signal retrieved when using the optimal output power for writing the optical disc 504 has a better symmetrical feature.

Figure 8:
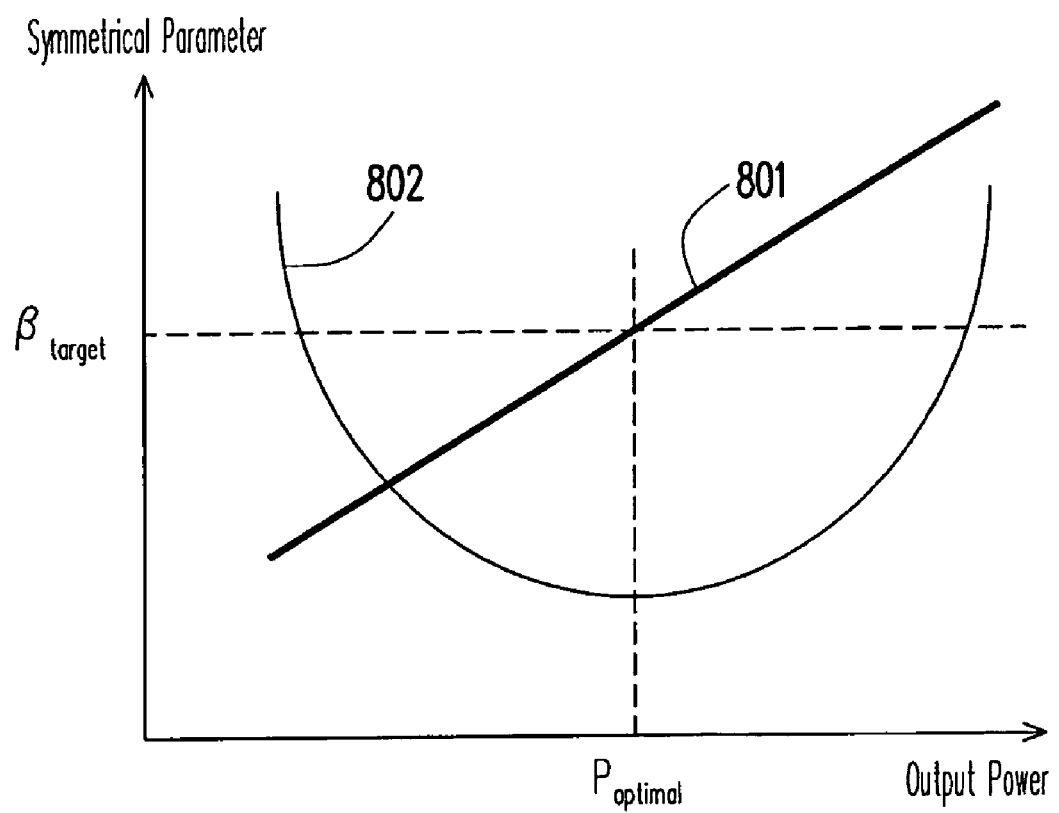
FIG. 8 is a schematic diagram illustrating a symmetrical parameter of the alternating current coupling high frequency signals affected by the output power.

Further, according to other aspects of the embodiment, the specific parameter of the alternating current coupling high frequency signal can be other parameters, such as jitter value, modulation, or the like. For example, FIG. 8 is a schematic diagram illustrating a symmetrical parameter of the alternating current coupling high frequency signals affected by the output power. Referring to FIG. 8, curve 801 is a linear curve describing the relationship between the output power and the symmetrical parameter β. When the symmetrical parameter is $β_{target}$, e.g., 0, the corresponding output power $P_{optimal}$ is the optimal output power. When the optimal output power $P_{optimal}$ is used for writing the optical disc, the alternating current coupling high frequency signal retrieved exhibits is best symmetrical, and the writing operation is performed with the best writing quality. Curve 802 describes a relationship between the output power and the jitter values.

Figure 9A:
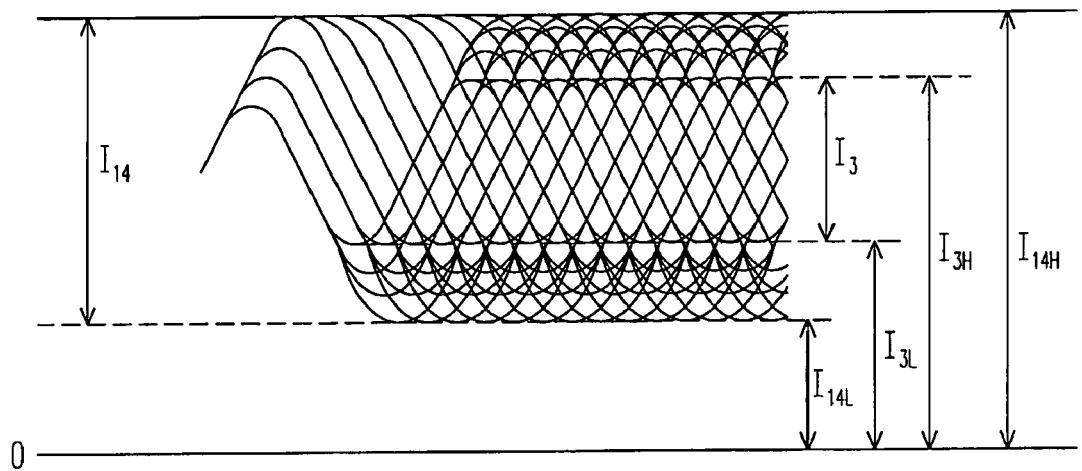
FIG. 9A is a schematic diagram illustrating intensities of the alternating current coupling high frequency signals.

Furthermore, in order to avoid writing data errors caused by a high speed writing operation of the optical disc driver, digital data are encoded by a method of limiting the continuous byte length, and then writing the encoded digital data to the optical disc with a non-return to zero inverted (NRZI) technology. The method converting 8-byte data to 14-byte data is often used for encoding. FIG. 9A is a schematic diagram illustrating intensities of the alternating current coupling high frequency signals. Referring to FIG. 9A, the modulation M of the alternating current coupling high frequency signal is defined as a the longest signal intensity, i.e., $M=I_{14}/I_{14}H$. Those of ordinary skill in the art should be aware of definitions of the length signal intensities, i.e., $I_3, I_{3L}, I_{3H}, I_{14}, I_{14L}$ and $I_{14H}$, such is not to be iterated hereby.

Figure 9B:
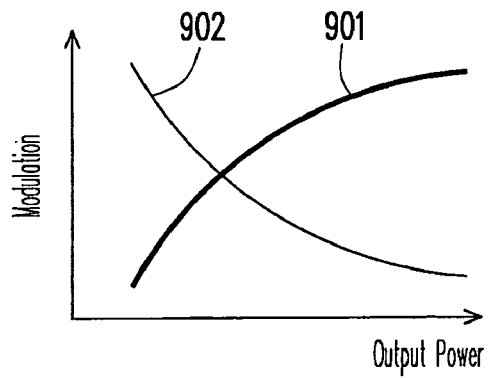
FIG. 9B is a schematic diagram illustrating a modulation of the alternating current coupling high frequency signals affected by the output power.

FIG. 9B is a schematic diagram illustrating a modulation of the alternating current coupling high frequency signals affected by the output power. Curve 901 describes a relationship between the output power and the modulation M. A further parameter γ can be obtained by calculating a first order differential of the curve 901 to the output power, i.e., $γ=(dM/dP_w)/(M/P_w)$, in which M is modulation, $P_w$ is the output power. As shown in FIGS. 8, 9A, and 9B, according to another embodiment of the present invention, the specific parameter obtained by the detect module 503 from the retrieved alternating current coupling high frequency signals can be one of jitter values, modulation, or parameter γ.

Referring to FIG. 5, according to another embodiment of the present invention, the optical pick-up head 502 further comprises a pre-diode sensor (not shown). The pre-diode sensor is a photo sensor for sensing a laser emitted from the optical pick-up head 502. Output parameters such as output currents, output voltages thereof can be used for obtaining the relationship between the output power and the instruction value, and thus adjusting the instruction value, and controlling the output power of the optical pick-up head 502. The operation may be described in detail below.

Figure 10:
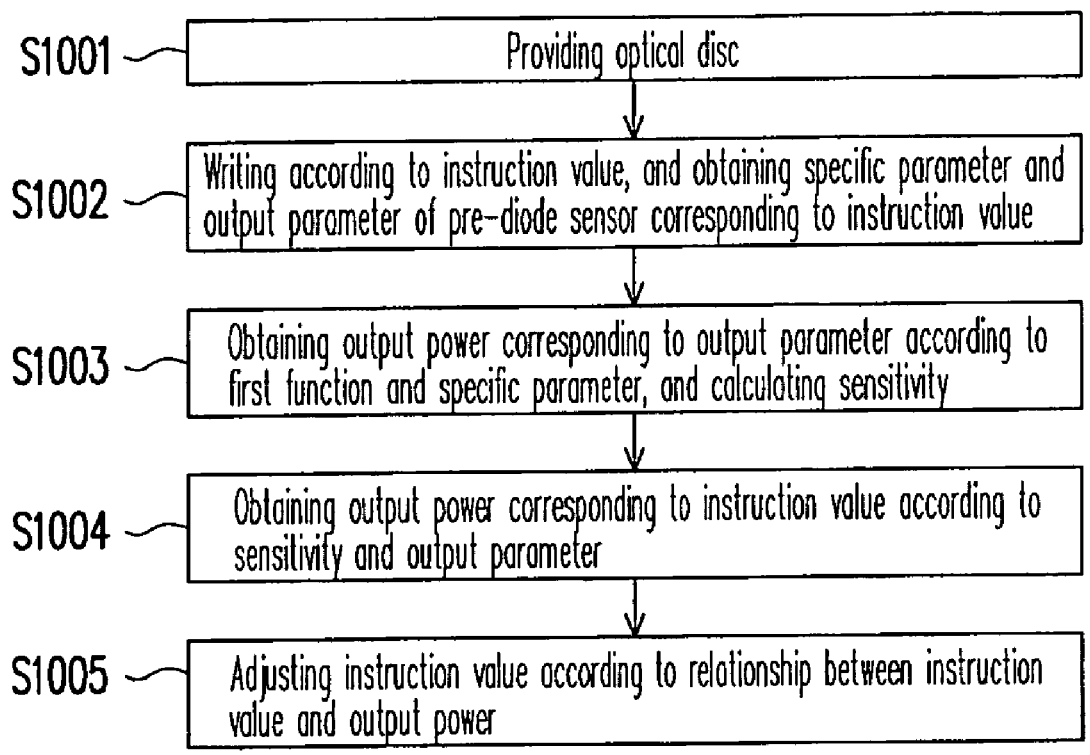
FIG. 10 is flow chart illustrating a method for automatically calibrating an output power of an optical pick-up head according to an embodiment of the present invention.

FIG. 10 is flow chart illustrating a method for automatically calibrating an output power of an optical pick-up head according to an embodiment of the present invention. Referring to FIG. 10, at step S1001, a test optical disc is provided, by which a relationship, defined as a first function hereby, between an output power of the optical disc 504 and a specific parameter can be obtained. Next, at step S1002, the automatic power control module 501 controls the optical pick-up head 502 to perform a writing operation to the optical disc 504 according to an instruction value DAC, and thus obtaining an output parameter of the pre-diode sensor corresponding to the instruction value DAC and the specific parameter corresponding to the instruction value DAC. Next, at step S1003, the output power corresponding to the output parameter of the pre-diode sensor can be obtained according to the first function and the obtained specific parameter, and thereby the sensitivity thereof can be calculated.

For example, supposing the obtained output parameter of the pre-diode sensor is an output voltage V, then the sensitivity $Se=P_w/V$, in which $P_w$ is the obtained output power. The sensitivity can be calculated when at least one specific parameter and the output parameter of the pre-diode sensor are known.

After calculating the sensitivity, at step S1004, the automatic power control module 501 can obtain the output power corresponding to the instruction value DAC according to the sensitivity and the output parameter of the pre-diode sensor. It can be learnt from step S1004 that if a plurality of instruction values is set for writing the optical disc 504, the relationship between the instruction value and the output power can be obtained according to the sensitivity and the output parameter of the pre-diode sensor corresponding to the instruction value. Accordingly, at step S1005, the automatic power control module 501 can further adjust the instruction value according to the relationship between the instruction value and the output power, so as to control the output power of the optical pick-up head.

In summary, the present invention exploits the advantages of information of test discs, relationship relating to the output power and the specific parameter to obtain the relationship between the instruction value and the output power when controlling the optical pick-up head to write the optical disc according to the instruction value, and therefore adjusts the instruction value, so as to realize an optimal writing characteristic of the optical pick-up head. Accordingly, the present invention uses information on the optical disc only for calibrating the output power of the optical pick-up head, without employing excessive devices for measuring the conversion characteristic of the instruction value and the output power.

Further, a sensitivity defines as relationship between an output parameter of the pre-diode sensor of the optical pick-up head and the output power of the optical pick-up head can be precisely measured by referring to the relationship between the output power for writing the optical disc and the specific parameter as obtained, when writing the optical disc with the optical pick-up head according to the instruction value. The relationship between the instruction value and the output power can be obtained by the relationship (such as the sensitivity) between the output parameter of the pre-diode sensor and the output power of the optical pick-up head, according to which the instruction value can be adjusted.

As such, the present invention has at least the following advantages:

1. Relationship between the instruction value and the output power can be obtained according to related information of the optical disc without introducing excessive devices, e.g., a power meter, or a bar code reader, and therefore the present invention is more adaptive for mass production.

2. Relationship between the output parameter of the pre-diode and the output power of the optical pick-up head can be precisely obtained by related information of the optical disc, according to which a preset reading power of the optical disc driver can be further calibrated.

3. It is more convenient for the manufacturers to repair the optical disc driver or replace parts of the optical disc driver.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for automatically calibrating an output power of an optical pick-up head, comprising:
    providing an optical disc, wherein a relationship between the output power for writing the optical disc and a specific parameter corresponding thereto is defined as a first function;
    controlling the optical pick-up head to perform a writing operation on the optical disc according to an instruction value, and obtaining the specific parameter corresponding to the instruction value;
    obtaining the output power corresponding to the instruction value according to the first function and the specific parameter; and
    adjusting the instruction value according to the instruction value and the output power for calibrating the output power of the optical pick-up head.

2. The method for automatically calibrating an output power of an optical pick-up head according to claim 1 further comprising:
    reading an optimal output power from the optical disc;
    controlling the optical pick-up head within a power range for performing the writing operation with the output power according to the optimal output power, and retrieving an alternating current coupling high frequency signal; and
    obtaining the specific parameter corresponding to the output power according to the alternating current coupling high frequency signal.

3. The method for automatically calibrating an output power of an optical pick-up head according to claim 1, wherein the step of controlling the optical pick-up head to perform the writing operation on the optical disc according to an instruction value, and obtaining the specific parameter corresponding to the instruction value further comprises:
    retrieving an alternating current coupling high frequency signal after performing the writing operation on the optical disc; and
    obtaining the specific parameter corresponding to the instruction value according to the alternating current coupling high frequency signal.

4. The method for automatically calibrating an output power of an optical pick-up head according to claim 1, wherein the specific parameter comprises a symmetrical parameter or a jitter value of alternating current coupling high frequency signal.

5. The method for automatically calibrating an output power of an optical pick-up head according to claim 1, wherein the specific parameter comprises an amplitude modulation of alternating current coupling high frequency signal.

6. The method for automatically calibrating an output power of an optical pick-up head according to claim 5, wherein the specific parameter is a $\gamma$ parameter of the alternating current coupling high frequency signal, wherein the $\gamma$ parameter is obtained by calculating a first order differential of the amplitude modulation to the output power.

7. The method for automatically calibrating an output power of an optical pick-up head according to claim 1, wherein the instruction value comprises an output voltage.

8. An optical disc driver adapted for automatically calibrating an output power of an optical pick-up head, comprising:
    an optical pick-up head;
    an automatic power control module, coupled to the optical pick-up head, for performing a writing operation on an optical disc according to an instruction value, wherein a relationship between the output power for writing the optical disc and a specific parameter is defined as a first function; and
    a detect module, coupled to the automatic power control module, for detecting the specific parameter corresponding to the instruction value of the optical disc and transmitting the specific parameter to the automatic power control module,
    wherein the automatic power control module is adapted to calculate the output power corresponding to the instruction value according to the first function and the specific parameter, and adjusts the instruction value according to the instruction value and the output power for calibrating the output power of the optical pick-up head.

9. The optical disc driver adapted for automatically calibrating an output power of an optical pick-up head according to claim 8, wherein the specific parameter comprises a symmetrical parameter of alternating current coupling high frequency signal.

10. The optical disc driver adapted for automatically calibrating an output power of an optical pick-up head according to claim 8, wherein the specific parameter comprises an amplitude modulation of the alternating current coupling high frequency signal.

11. The optical disc driver adapted for automatically calibrating an output power of an optical pick-up head according to claim 10, wherein the specific parameter comprises a $\gamma$ parameter of the alternating current coupling high frequency signal, wherein the $\gamma$ parameter is obtained by calculating a first order differential of the amplitude modulation to the output power.

12. The optical disc driver adapted for automatically calibrating an output power of an optical pick-up head according to claim 8, wherein the specific parameter comprises a jitter value of alternating current coupling high frequency signal.

13. The optical disc driver adapted for automatically calibrating an output power of an optical pick-up head according to claim 8 wherein the instruction value comprises an output voltage.

* * * * *